US006706362B2

(12) United States Patent
Doesburg et al.

(10) Patent No.: US 6,706,362 B2
(45) Date of Patent: Mar. 16, 2004

(54) SODIUM SILICATE COATING PROCESS AND PRODUCTS INCORPORATING SAME

(75) Inventors: Van I. Doesburg, Dalton, GA (US); James E. Wilson, Jr., Resaca, GA (US)

(73) Assignee: Textile Rubber & Chemical Co., Inc., Dalton, GA (US)

( * ) Notice: Subject to any disclaimer, the term of this patent is extended or adjusted under 35 U.S.C. 154(b) by 173 days.

(21) Appl. No.: 10/060,934

(22) Filed: Jan. 30, 2002

(65) Prior Publication Data

US 2003/0148061 A1 Aug. 7, 2003

(51) Int. Cl.$^7$ .................. B32B 33/00; B32B 9/04; D05C 17/02
(52) U.S. Cl. .................. 428/95; 428/96; 428/448; 427/397.7; 427/397.8; 427/402
(58) Field of Search .................. 428/95, 96, 97, 428/446, 448, 453; 427/372.2, 379, 389.9, 397.7, 397.8, 402, 412

(56) References Cited

U.S. PATENT DOCUMENTS

| 3,830,776 A | | 8/1974 | Carlson et al. |
|---|---|---|---|
| 3,917,547 A | | 11/1975 | Massey et al. |
| 4,185,135 A | * | 1/1980 | Huff .................. 428/96 |
| 4,216,130 A | * | 8/1980 | Rigge et al. .................. 523/200 |
| 4,217,383 A | | 8/1980 | Patterson et al. |
| 4,512,831 A | | 4/1985 | Tillotson |
| 4,632,850 A | | 12/1986 | Tillotson |
| 4,661,533 A | | 4/1987 | Stobby |
| 4,824,709 A | * | 4/1989 | Tschirch .................. 428/95 |
| 4,853,054 A | | 8/1989 | Turner et al. |
| 5,159,012 A | | 10/1992 | Doesburg et al. |
| 5,460,855 A | * | 10/1995 | Andersson .................. 427/397.8 |
| 5,733,945 A | | 3/1998 | Simpson |
| 6,328,833 B1 | | 12/2001 | Holeschovsky et al. |

FOREIGN PATENT DOCUMENTS

| DE | 2450286 A | * | 4/1976 | .................. C09D/1/04 |
|---|---|---|---|---|
| SU | 1112039 A | * | 9/1984 | .................. C08L/9/08 |
| SU | 1278245 A | * | 12/1986 | .................. B29C/65/04 |
| WO | WO 8912715 A1 | * | 12/1989 | .................. D06N/7/00 |

* cited by examiner

Primary Examiner—Cheryl A. Juska
(74) Attorney, Agent, or Firm—Kilpatrick Stockton LLP

(57) ABSTRACT

There is disclosed a carpet product. The carpet product comprises a polymer-coated carpet backing, a layer of silicate on the polymer-coated carpet backing, and a layer of polyurethane on the layer of silicate. A method of producing the carpet product is also disclosed.

24 Claims, No Drawings

SODIUM SILICATE COATING PROCESS AND PRODUCTS INCORPORATING SAME

FIELD OF INVENTION

The present invention relates generally to textile products, and, more specifically, to carpet products having an attached layer of polyurethane.

BACKGROUND OF THE INVENTION

The majority of all tufted carpet is manufactured today by tufting a carpet yarn into a synthetic primary backing material. Typically, the primary backing material is a woven flat strand polypropylene material and is passed through a tufting machine where yarn elements are stitched through this primary backing material. Following this tufting operation, a coating of latex material is applied to the back of the yarn loops to anchor the yarn elements in place in the backing, add dimensional stability to the carpet, and provide a smooth undersurface for the carpet. Examples of carpet back coating processes are disclosed in U.S. Pat. Nos. 4,217,383 and 4,632,850.

Polyurethane compositions are well known in the art. Cellular polyurethane, such as foamed or frothed polyurethane, is used for items such as integrally attached cushions for carpet. A method of attaching a cellular polyurethane cushion to a carpet backing is shown in U.S. Pat. No. 4,512,831. Non-cellular polyurethane or polyurethane elastomers can be used for items, such as carpet tiles. A carpet tile using polyurethane elastomers is disclosed in U.S. Pat. No. 5,159,012.

Sometimes there are problems associated with adhering a polyurethane cushion, either cellular or non-cellular, to a carpet backing with a back coating of a polymer, such as styrene-butadiene. Therefore, a need exists for a system for reliably adhering a polyurethane coating to a back-coated carpet product.

SUMMARY OF THE INVENTION

The present invention satisfies the above-described needs by providing a sodium silicate layer intermediate a polymer-coated carpet backing and an attached polyurethane layer. The carpet product of the present invention comprises a primary backing tufted with yarn to form a face pile on one side of the backing and loop backs on the other side of the backing. A polymer coating on the other side of the backing secures the loop backs thereto. A layer of silicate is formed on the polymer coating and a layer of polyurethane is disposed on the layer of silicate.

In an alternate embodiment, the present invention comprises a method of making a carpet product. The method comprises applying a layer of silicate to a polymer-coated carpet backing, curing the layer of silicate, applying a layer of polyurethane to the cured layer of silicate, and curing the layer of polyurethane.

Accordingly, it is an object of the present invention to provide an improved carpet product and an improved method of making a carpet product.

Another object of the present invention is to provide an improved bond between a polymer-coated carpet back and a polyurethane layer.

A further object of the present invention is to provide a reliable method of attaching a polyurethane layer to a carpet product.

These and other objects, features and advantages of the present invention will become apparent after a review of the following detailed description of the disclosed embodiments and the appended claims.

DETAILED DESCRIPTION OF THE DISCLOSED EMBODIMENTS

The present invention relates to carpet products and the method of their manufacture. Typically, a tufted pile carpet is made from a primary backing material, such as a woven flat strand polypropylene material, that is passed through a tufting machine where yarn elements are stitched through the primary backing material. Following this tufting operation, a coating of a polymer, usually a latex polymer, is applied to the back of the yarn loops to anchor the yarn elements in place in the primary backing material. Examples of primary carpet backing material coating processes are disclosed in U.S. Pat. Nos. 4,217,383 and 4,632,850, the disclosures of which are incorporated herein by reference.

Polymers that are used to coat the primary carpet backing material and that are the subject of the present invention are those polymers that tend to be neutral, acidic or have acidic moieties attached thereto. Such polymers have a pH of 8.1 or lower. Examples of such polymers include, but are not limited to, styrene-butadiene rubber, ethyl vinyl acetate, and acrylics.

It is also typical in making carpet products to attach a layer of polyurethane to the polymer-coated primary carpet backing material. Polyurethane compositions in accordance with the present invention may be solid or cellular, i.e., foamed or frothed, rigid or flexible. The particular composition of the polyurethane-forming components is not a critical aspect of the present invention. A method of attaching a cellular polyurethane cushion to a carpet backing is shown in U.S. Pat. No. 4,512,831, the disclosure of which is incorporated herein by reference. A carpet tile using polyurethane elastomers is disclosed in U.S. Pat. No. 5,159,012, the disclosure of which is incorporated herein by reference.

Polyurethane is a polymerization product of a polyol component, an isocyanate component, water (optional) and a catalyst system that promotes a polymerization reaction between the isocyanate component and the polyol component to form the polyurethane. Conventional practice in the art is to form an isocyanate mixture, referred to as SIDE A; and to form a mixture of polyols, chain extenders, cross-linking agents, fillers, blowing agents, surfactants, catalysts etc., commonly referred to as SIDE B. The SIDE A component and the SIDE B component are mixed together at a desired ratio to form the polyurethane polymer. See U.S. Pat. No. 5,159,012 the disclosure of which is incorporated herein by reference.

The polyol component may contain either a single polyol or a mixture of two or more polyols. The specific polyols useful in the manufacture of polyurethane elastomers are well known in the art and include aliphatic, alicyclic and aromatic polyols. More specifically, the polyol component useful in this invention has an average functionality within the range of 1.7–8, preferably within the range of 2–3, and an average molecular weight of from about 900 to about 9000, preferably from about 1000 to about 6000. The polyol component may contain isomeric and polymeric polyols. Additionally, the polyol component has a hydroxyl number of less than about 150, preferably less than about 115.

The preferred polyols suitable for use in this process are ethylene glycol; diethylene glycol; propylene glycol; dipropylene glycol; glycerin; sucrose; butylene glycol; polyether polyols derived from ethylene oxide, propylene oxide, and mixtures of such oxides; polyether polyols derived from propylene oxide and capped with ethylene oxide; polyethylene glycol; polypropylene glycol; polybutylene glycol; 1,2-polydimethylene glycol; polydecamethylene glycol and mixtures of the above polyols.

The polyurethane composition can be either foamed or unfoamed. In those instances where foaming is desired, such can be accomplished by using an inert gas frothing technique, a volatile liquid blowing agent technique, a chemically blown (water) technique or combinations thereof, in conjunction with a surface active agent, such as the commercially available block polysiloxane-polyoxyalkylene copolymers.

Chemical blowing of the polyurethane composition, if desired, is effected by controlling the catalyst system, the water concentration and the isocyanate level. Generally, water is present in the reaction mixture from between approximately 0.01 to 5.0 parts per hundred parts of polyol, preferably between 0.1 parts and 2 parts, over and above the water normally present in the reaction mixture. The catalyst system not only must effect rapid curing but also must control formation of carbon dioxide resulting from the reaction of water and isocyanate. Blowing should be controlled to effect expansion between about 5% and 200%, preferably between approximately 7% and 100%, so that a carpet yarn loop back stitch is saturated with reactants and the reactants expand sufficiently prior to curing. Suitable catalysts are those which promote polyurethane formation and concurrently promote the blowing reaction. Preferred catalysts are organic metal compounds, amines, and metal soaps, such catalysts include dibutyl tin dilaurate, tin mercaptides and stannous octanoate.

The isocyanate component may contain either a single isocyanate or a mixture of two or more isocyanates. The specific isocyanates useful in the manufacture of polyurethane polymers are well known in the art and include aliphatic, alicyclic and aromatic isocyanates. Preferred isocyanates have an average functionality within the range of 2–8, preferably within the range of 2–5. Examples of the preferred isocyanates are 2,4-toluene diisocyanate; 2,6-toluene diisocyanate; 1,6-hexamethylene diisocyanate; naphthalene-1,4-diisocyanate; diphenylmethane-4,4'-diisocyanate (MDI); 4,4'-diphenylene diisocyanate; 3,3'-dimethoxy biphenylene diisocyanate; polymeric forms of the above diisocyanates, diisocyanato carbodiimide modified diphenylmethane 4,4'-diisocyanate (modified MDI), isocyanate terminated prepolymers; diphenylmethane-2,4'-diisocyanate, and mixtures of the foregoing. The isocyanate component (Side A) usually is employed in stoichiometric excess to assure complete reaction with the functional groups of the polyol and with any water which may be present. Preferably, from 20 to 80 parts isocyanate per one hundred parts of polyol are used in the reaction mixture.

Other polyurethane compositions that are useful in the present invention are disclosed in, U.S. Pat. Nos. 6,328,833; 5,733,945; 5,159,012; 4,853,054; 4,661,533; 3,917,547; 3,830,776; and 4,512,831, the disclosures of which are all incorporated herein by reference.

A general polyurethane formulation that is useful in the present invention is shown in Table I below:

TABLE I

| Ingredient | Parts |
| --- | --- |
| Polyol Blend A* | 90.0 |
| Diethylene glycol | 10.0 |

TABLE I-continued

| Ingredient | Parts |
| --- | --- |
| Alumina trihydrate | 40.0 |
| Calcium carbonate | 40.0 |
| Catalysts** | 0.01 to 1.0 |
| Silicone surfactant | 0.125 to 3.0 |
| MDI blend*** | 34.6 |

*50/50 blend of a 2000 eq. wt., 19% ethylene oxide capped poly (propylene oxide) diol, and a 1600 eq. wt., 14% ethylene oxide capped poly(propylene oxide) triol.
**Catalyst selected from: organic metal compounds, organic tin mercaptides, amines, metal acetyl acetonates, and acid blocked tertiary amines.
***90/10 blend of PAPI 94 and Isonate 143L; Isonate 143L is a modified MDI and PAPI 94 is a polymeric MDI both available from Dow Chemical Co.

It has been discovered as a part of the present invention that the use of polymers that tend to be acidic or have acidic moieties attached thereto, as described above, interfere with the bonding of a layer of polyurethane thereto. It has further been discovered that the use of fluorocarbon pile treatments, for example fluorocarbon soil and stain resistant treatments, such as Scotch Guard by the 3M Company, Minneapolis, Minn., and Stain Master by E. I. Du Pont De Nemours and Company, Wilmington, Del., also tend to interfere with the bonding of a layer of polyurethane to a carpet backing whose face pile has been treated with such fluorocarbon materials. Without wishing to be bound thereby, it is believed that such fluorocarbon materials, although they are applied to the face pile of the carpet, migrate through the primary backing material and contaminate the polymer coated primary backing material, and, thus, interfere with the bonding of materials thereto, such as polyurethanes or other polymers. When fluorocarbon pile treatments are used, the specific polymer that is used to precoat the primary carpet backing material is not critical.

It has also been found as a part of the present invention that a layer of silicate when applied to the polymer-coated primary backing material improves the bond strength between the later applied polyurethane layer and the polymer-coated primary backing material. Silicates that are useful in the present invention include, but are not limited to, sodium silicate (CAS #1344-09-8), sodium metasilicate (CAS #6834-92-0), sodium sesquisilicate, sodium orthosilicate, and mixtures thereof. Sodium silicate is commercially available from Vulcan Performance Chemicals, Dalton, Ga.

The silicate is preferably applied to the polymer-coated primary backing material as an aqueous solution having a concentration of silicate of approximately 1 to 25 percent by weight; preferably, approximately 5 percent by weight. The silicate solution is applied to the polymer-coated primary backing material at a rate so as to yield a dry silicate weight of approximately 0.01 to 0.25 ounces per square yard of carpet; preferably, approximately 0.08 to 0.15 ounces per square yard. Silicate levels greater than 0.25 ounces per square yard may be used but do not tend to significantly increase the benefit of the coating.

The silicate solution may optionally include a surfactant to improve to even distribution of the solution on the polymer-coated primary backing material. A preferred surfactant is Octawet 70, a sodium di 2-ethylhexyl sulfosuccinate surfactant, available from Tiarco Chemical Co., Dalton, Ga. The surfactant is present in the silicate solution at a concentration of approximately 0.01 to 1.0 percent by weight; preferably, approximately 0.2 percent by weight.

The silicate solution may be applied to the polymer-coated primary backing material by any suitable method, such as by lick coating, roller coating, brushing, spraying, and the like.

After the silicate solution is applied to the polymer-coated primary backing material, it must be dried or cured. Curing of the silicate solution is affected by removal of the water, such as by drying, such as in a forced air oven. It is preferred that the silicate solution be dried at a temperature of approximately 220 to 375° F.; preferably approximately 240° to 290° F., for a period of time sufficient to convert the silicate solution to a silicate film, such as approximately 0.5 to 10 minutes.

After the silicate solution has been applied to the polymer-coated primary backing material and cured, the layer of polyurethane can be applied thereto in the usual manners as described above. The presence of the silicate layer between the polymer-coated primary backing material and the polyurethane layer improves the bond strength between those materials. The bond strength between the polymer-coated primary backing material and the polyurethane layer when using the silicate coating in accordance with the present invention is preferably at least twice the strength of the same polymer-coated primary backing material and the polyurethane layer without the silicate layer.

The following examples are illustrative of the present invention and are not intended to limit the scope of the invention as set forth in the appended claims. All temperatures are in degrees Fahrenheit and all percentages are by weight unless specifically stated otherwise.

EXAMPLE 1

Three polyurethane compositions are prepared according to the formulas shown in Table II below:

TABLE II

Formula A

| Ingredient | Formula A |
|---|---|
| Poly Blend A* | 90.0 |
| Diethylene glycol | 10.0 |
| Alumina trihydrate | 40.0 |
| Calcium carbonate | 40.0 |
| Catalyst | 0.125 |
| L5614 surfactant | 2.0 |
| MDI blend* | 37.5 |

*See Table I above.

Formula B

| Ingredient | Formula B |
|---|---|
| Arcol E351 | 98.0 |
| Ethylene glycol | 2.0 |
| Calcium carbonate | 100.0 |
| Catalyst | 0.05–2.0 |
| L5614 surfactant | 2.0 |
| Mondur 448 | 21.3 |

Formula C

| Ingredient | Formula C |
|---|---|
| Multranol 9139 | 95.0 |
| Diethylene glycol | 5.0 |
| Calcium carbonate | 100.0 |
| Catalyst | 0.125 |

TABLE II-continued

| L5614 surfactant | 2.0 |
|---|---|
| Mondur 448 | 22.5 |

All amounts stated in Table II above are in parts by weight. Multranol 9139 is a triol and Mondur 448 is an MDI, both are available from Bayer Corp. Arcol E351 is a diol available from Huntsman Corp. Isonate 143L is a modified MDI and PAPI 94 is a polymeric MDI both available from Dow Chemical Co. L5614 surfactant is a silicon copolymer available from OSI Specialties, Greenwich, Conn.

A sodium silicate solution is prepared according to the formula shown in Table III below:

TABLE III

| Ingredient | Parts by Weight |
|---|---|
| 40% by weight aqueous Sodium Silicate solution | 12.5 |
| Octawet 70 | 0.1 |
| Water | 87.4 |

A 40% by weight aqueous sodium silicate solution is available from Vulcan Performance Chemicals, Dalton, Ga.

Two samples of commercially available carpet are obtained.

The face pile for each carpet sample is treated with a fluorocarbon coating to resist soil and stains; one sample being treated with 3M's ScotchGuard and the other with DuPont's StainMaster. The samples of carpet have a precoat on the primary backing material of SBR. Each of the precoated carpet backing materials is treated with the sodium silicate solution shown in Table III. The sodium silicate solution is applied to the carpet backing by a lick coating. The sodium silicate solution is applied at a rate of 0.1 ounces per square yard of carpet. The sodium silicate coating is then dried in a hot air oven at a temperature of 250°. One-quarter inch thick polyurethane foam coatings using each of the three formulas from Table II are then applied to separate sample of the sodium silicate coated carpet backing using conventional coating techniques. Identical polyurethane foam coatings are also applied to identical carpet sample that do not include the sodium silicate coating. The polyurethane coatings are then permitted to cure.

Delamination strength of each sample is determined on an Instron Tester. The amount of force necessary to separate the foam coating from the carpet backing is at least twice the amount for the sodium silicate coated samples as it is for the samples not including the sodium silicate coating.

EXAMPLE 2

Two commercial carpet samples were first precoated with two different standard type SBR latex compounds. After drying and curing the latex precoats, one-half of each carpet sample was over-coated with a five percent (5%) aqueous solution of sodium silicate (Table III). The remaining portion of the carpet sample was left untreated with the sodium silicate as an experimental control.

Uncured, frothed polyurethane was coated approximately ⅛ inch thick onto each carpet sample and a loose woven fabric was pressed into the upper surface of the uncured polyurethane foam. Both samples were placed in a 250° F. hot air oven for ten minutes to cure the polyurethane foam.

Two-inch wide strips were cut from both the treated and untreated areas of each test sample. Delamination strength of each sample was determined on an Instron Tester with the results reported in grams per inch width. The results of the delamination test are shown in Table IV below:

TABLE IV

|  | CARPET SAMPLE A | | CARPET SAMPLE B | |
| --- | --- | --- | --- | --- |
| Repetition | Untreated | Silicate Treated | Untreated | Silicate Treated |
| No. 1 | 239 gpi | 636 gpi | 114 gpi | 749 gpi |
| No. 2 | 286 gpi | 749 gpi | 132 gpi | 636 gpi |
| No. 3 | 239 gpi | 681 gpi | 136 gpi | ** |
| No. 4 | 329 gpi | ** | 170 gpi | 681 gpi |

** The polyurethane foam split before delamination occurred.
gpi = grams per inch width The foregoing test results demonstrate that the bond strength for sample treated with the sodium silicate solution had a bond strength between the polyurethane foam and the carpet primary backing material at least twice that of those sample that were not treated with the sodium silicate solution, and in some cases was as much as 6.5 times as great.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A carpet product comprising:
   a primary backing tufted with yarn to form a face pile on one side of said backing and loop backs on the other side of said backing;
   a polymer coating on said other side of said backing to secure said loop backs thereto;
   a layer consisting essentially of silicate formed on said polymer coating; and
   a layer of polyurethane disposed on said layer of silicate.

2. The carpet product of claim 1, wherein said silicate layer is selected from sodium silicate, sodium metasilicate, sodium sesquisilicate, sodium orthosilicate, and mixtures thereof.

3. The carpet product of claim 1, wherein said silicate layer is sodium silicate.

4. The carpet product of claim 1, wherein said polyurethane layer is a polyurethane foam layer.

5. The carpet product of claim 1, wherein said polyurethane layer is an elastomeric polyurethane layer.

6. The carpet product of claim 1, wherein said silicate layer is a film.

7. The carpet product of claim 1, wherein said polymer coating is selected from styrene-butadiene rubber (SBR), ethyl vinyl acetate (EVA) and acrylic.

8. The carpet product of claim 1, wherein said polymer coating is styrene-butadiene.

9. A method comprising the steps of
   applying a layer consisting essentially of silicate to a polymer-coated carpet backing;
   curing the layer of silicate;
   applying a layer of polyurethane to said cured layer of silicate; and
   curing the layer of polyurethane.

10. The method of claim 9, wherein said silicate layer is selected from sodium silicate, sodium metasilicate, sodium sesquisilicate, sodium orthosilicate, and mixtures thereof.

11. The method of claim 9, wherein said silicate layer is sodium silicate.

12. The method of claim 9, wherein said silicate layer is applied at a rate so as to yield a dry silicate weight of approximately 0.01 to 0.25 ounces per square yard of carpet.

13. The method of claim 9, wherein said silicate layer is applied at a rate so as to yield a dry silicate weight of approximately 0.08 to 0.15 ounces per square yard of carpet.

14. The method of claim 9, wherein said layer of silicate is cured by heating at a temperature of approximately 220° to 375° F.

15. The method of claim 9, wherein said layer of silicate is cured by heating at a temperature of approximately 240° to 290° F.

16. The method of claim 9, wherein said polyurethane layer is a polyurethane foam layer.

17. The method of claim 9, wherein said polyurethane layer is an elastomeric polyurethane layer.

18. The method of claim 9, wherein said polymer coating is selected from styrene-butadiene rubber, ethyl vinyl acetate and acrylic.

19. A carpet product made by the method of claim 9.

20. A carpet product comprising:
   a polymer-coated carpet backing;
   a layer consisting essentially of silicate on said polymer-coated carpet backing; and
   a layer of polyurethane on said layer of silicate.

21. The carpet product of claim 20, wherein said polymer used to form said polymer-coated carpet backing is styrene-butadiene rubber.

22. The carpet product of claim 20, wherein said silicate is sodium silicate.

23. A carpet product comprising:
   a polymer-coated carpet backing, said polymer comprising styrene-butadiene rubber;
   a layer consisting essentially of sodium silicate on said polymer-coated carpet backing, said silicate layer being present in an amount of approximately 0.01 to 0.25 ounces per square yard of carpet; and
   a layer of polyurethane foam on said layer of silicate.

24. A carpet product comprising:
   a polymer-coated carpet backing; and
   a layer consisting essentially of silicate on said polymer-coated carpet backing.

* * * * *